US008538430B1

(12) United States Patent  
Filiatrault et al.

(10) Patent No.: US 8,538,430 B1  
(45) Date of Patent: Sep. 17, 2013

(54) SYSTEM AND METHOD FOR HANDOFF OF MOBILE TERMINALS BETWEEN DIFFERENT WIRELESS ACCESS NETWORK TECHNOLOGIES

(75) Inventors: Charles Filiatrault, Montreal (CA); Azeem Ahmad, Allen, TX (US); Larry T. Bolen, McKinney, TX (US); Eric W. Parsons, Stittsville (CA)

(73) Assignee: Apple Inc., Cupertino, CA (US)

( * ) Notice: Subject to any disclaimer, the term of this patent is extended or adjusted under 35 U.S.C. 154(b) by 1073 days.

(21) Appl. No.: 12/052,457

(22) Filed: Mar. 20, 2008

Related U.S. Application Data

(60) Provisional application No. 60/896,424, filed on Mar. 22, 2007.

(51) Int. Cl.  
*H04W 36/00* (2009.01)

(52) U.S. Cl.  
USPC ........... 455/436; 455/437; 455/438; 455/439; 455/440; 455/441; 370/331; 370/329

(58) Field of Classification Search  
USPC .............. 370/329–334; 455/435.1–444, 436, 455/437, 438, 439, 440, 441, 442, 443  
See application file for complete search history.

(56) References Cited

U.S. PATENT DOCUMENTS

| 2003/0219024 A1* | 11/2003 | Purnadi et al. ............... 370/401 |
| 2005/0122941 A1* | 6/2005 | Wu et al. ....................... 370/338 |
| 2006/0221901 A1* | 10/2006 | Yaqub et al. .................. 370/331 |

OTHER PUBLICATIONS

Hyun-Ho Choi, "Seamless Handoff Scheme Based on Pre-registration and Pre-authentication for UMTS-WLAN Interworking", 2006 Kluwer Academic Publishers.*

* cited by examiner

*Primary Examiner* — Kamran Afshar  
*Assistant Examiner* — Sayed T Zewari  
(74) *Attorney, Agent, or Firm* — Meyertons, Hood, Kivlin, Kowert & Goetzel, P.C.

(57) ABSTRACT

A system and method of facilitating handoff of communications with a mobile terminal between a first wireless access network and a second wireless access network having different air interfaces. The system and method including pre-registering the mobile terminal in the second access network prior to handoff, while the mobile terminal is conducting a communication session using the first access network. Upon a determination that a handoff is needed, communication is transparently tunneled to the secondary access network through the primary access network. During tunneling, the air link of the first wireless access network is employed to communicate with the secondary access network to facilitate the handoff.

17 Claims, 3 Drawing Sheets

SYSTEM AND METHOD FOR HANDOFF OF MOBILE TERMINALS BETWEEN DIFFERENT WIRELESS ACCESS NETWORK TECHNOLOGIES

CROSS-REFERENCE TO RELATED APPLICATION

This application is related to and claims priority to U.S. Provisional Patent Application Ser. No. 60/896,424, filed Mar. 22, 2007, entitled Handoff of Mobile From LTE to 1XEVDO, the entirety of which is incorporated herein by reference.

STATEMENT REGARDING FEDERALLY SPONSORED RESEARCH OR DEVELOPMENT n/a

FIELD OF THE INVENTION

The present invention relates to providing interoperability and service continuity between a primary access network and a secondary access network, and more particularly to a method and system that provides interoperability and service continuity between long-term evolution ("LTE") networks and evolution-data optimized ("EV-DO") networks by pre-registering a mobile terminal in the EV-DO network while the mobile terminal is actively communicating with the LTE network.

BACKGROUND OF THE INVENTION

Wireless technologies are evolving toward broadband information access across multiple networking platforms to meet demand for continuous availability of multimedia applications. Recent trends indicate that wide-area cellular networks based on second, third and fourth generation ("2G", "3G" and "4G") standards and wireless local area networks ("WLANs") will co-exist to offer multimedia services to end users. Seamless mobility across the multiple networking platforms is needed to enhance interoperability and service continuity among the various wireless networks.

Mobility management provides universal wireless coverage and broadband access by strategically combining multiple networking platforms. During mobility management, the system may perform both intra-technology handoffs and inter-technology handoffs. Intra-technology handoffs include the traditional horizontal handoff process in which the mobile terminal hands-off between evolved Node-B ("eNB"), access points ("AP") or base stations ("BS") using the same access technology. Alternatively, inter-technology handoffs, commonly referred to as vertical handoffs ("VHO"), are performed when the mobile terminals roam between different access technologies.

VHO may include moving out of a preferred network ("MOUT") or moving into a preferred network ("MIN"). For example, handoff procedures may be initiated when signal strength measurements originating in the primary network fall below pre-selected threshold parameters. The mobile terminal may detect the weak signal strength emanating from the primary network and may initiate a handoff to the secondary network having strong signal strength by reporting the weak signal to the primary network.

Frequently, during communication handoffs between different access networks, mobile terminals experience loss of service or service interruptions while negotiating the handoff exchange between the wireless access networks. For example, the loss of service may result due to an extended length of time needed for the target access network to negotiate resources for and with the mobile terminals. Alternatively, service interruptions may occur following the handoff preparation due to an extended length of time needed for the mobile terminal to switch to the new technology provided in the target access network.

Additionally, multiple radios are typically included in a mobile terminal to support communications with different access networks. The multiple radios increase battery consumption, increase circuit complexity and frustrate miniaturization efforts of mobile terminals, among providing other drawbacks.

What is desired is an arrangement under which a mobile terminal can seamlessly handoff communications from one wireless access network to a different wireless access network in an efficient manner that reduces latency during the transition. Additionally, it is desirable to include a single radio in the mobile terminal that communicates with the different access networks to reduce the size and power consumption of the mobile terminals, among providing other benefits.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In accordance with an aspect, the present invention provides a system for enabling a mobile terminal to handoff communications between at least two different wireless access networks. The system includes a first wireless access network having a first air interface standard and a tunneling module. A second wireless access network is provided having a second air interface standard that is different from the first air interface standard. The first wireless access network tunnels signaling data packets to the second wireless access network. The signaling data packets are tunneled to the second wireless access network using the first air interface standard. The tunneling module is provided in data communication with the second wireless access network to pre-register the mobile terminal with the second wireless access network. The mobile terminal is pre-registered without consuming air interface resources on the second wireless access network, while the mobile terminal is engaged in a communication session in the first wireless access network.

In accordance with another aspect, the present invention provides a method of facilitating handoff of communications with a mobile terminal between a first wireless access network having a first air interface standard and a second wireless access network having a second air interface standard that is different from the first air interface standard. Signaling data packets are tunneled from the first wireless access network to the second wireless access network, the signaling data packets being tunneled to the second wireless access network using the first air interface standard. The mobile terminal is pre-registered with the second wireless access network without consuming air interface resources on the second wireless access network, while the mobile terminal is engaged in a communication session in the first wireless access network.

In accordance with yet another aspect, the present invention provides a method of facilitating handoff of communications with a single radio mobile terminal between at least two different wireless access networks. Communication occurs with a first wireless access network having a first air interface standard and with a second wireless access network having a second air interface standard using encapsulated signaling data packets. The encapsulated signaling data packets are directed to the second wireless access network in a protocol that is associated with the first wireless access network. Encapsulated signaling data packets are used to pre-register the mobile terminal with the second wireless access network without consuming air interface resources on the second wireless access network, while the mobile terminal is engaged in a communication session in the first wireless access network.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein.

DETAILED DESCRIPTION OF THE INVENTION

Long-term evolution ("LTE") is part of the third generation partnership project ("3GPP") and is directed to improving the universal mobile telecommunications system ("UMTS") mobile telephone standard by providing a simplified, all-packet architecture. UMTS technology supports mobile internet protocol ("IP") services, such as music downloads, video sharing, voice over IP broadband access, and other IP services to laptops, personal digital assistants ("PDAs") and other mobile terminals. LTE enhances current UMTS capabilities by providing improved efficiency, lower costs, increased peak data rates, lower latency, improved services and improved integration with other open standards.

LTE includes an evolved packet system ("EPS") architecture having an evolved packet core ("EPC") on the core side and an evolved UMTS terrestrial radio access network ("E-UTRAN") on the access side. The EPS is designed to minimize the number of signal hops that occur during signal transmission. The EPS also distributes processing loads across the network. The EPS user plane includes base station nodes and gateway nodes.

Figure 1:
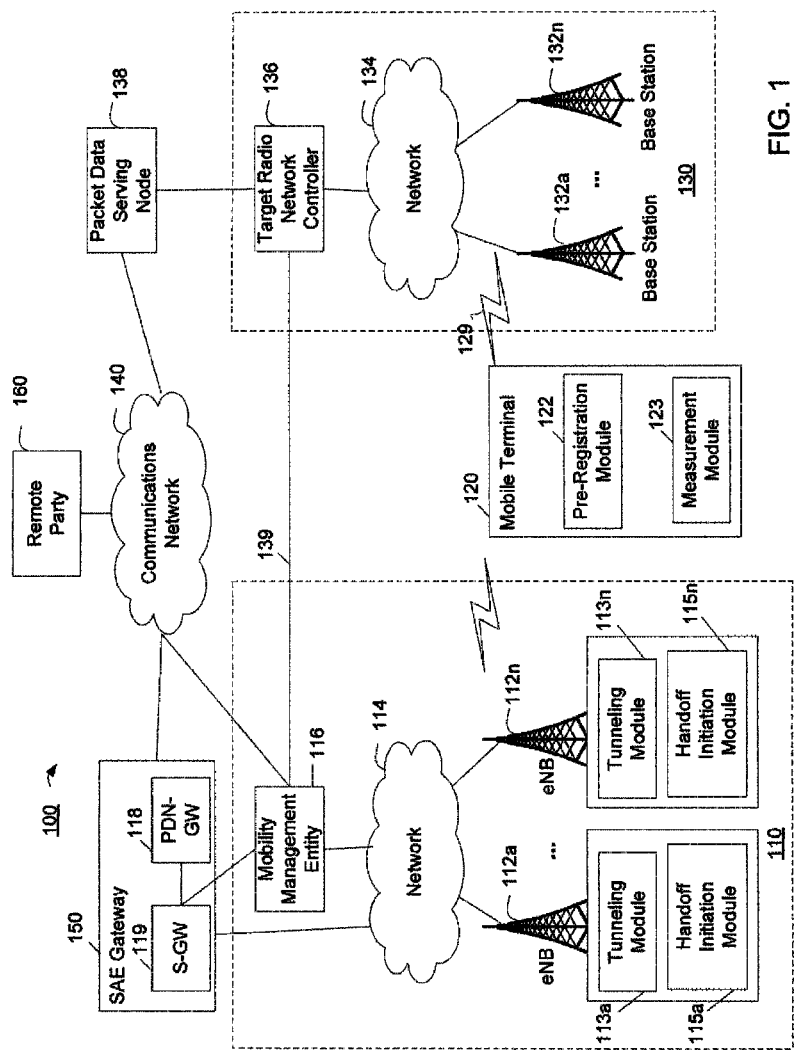
FIG. 1 is a block diagram of the network architecture of multiple wireless access networks constructed in accordance with the principles of the present invention.

Referring now to the drawing figures in which like reference designators refer to like elements, FIG. 1 illustrates an exemplary block diagram of a system designated generally as "100" that enables mobile terminals 120 to migrate between different access networks in accordance with the principles of the present invention. The system 100 includes a first access network 110, e.g., an LTE network, a second access network 130, e.g., an EV-DO network, and a communications network 140. According to one embodiment, the invention is directed to moving mobile terminals 120 from the LTE network 110 to the EV-DO network 130, when the source LTE network 110 determines that the mobile terminals 120 will be better served in the EVDO network 130, such as prior to the mobile terminals 120 falling off the LTE network 110.

It should be appreciated that, although the invention is described with reference to the LTE network 110 and the EV-DO network 130, the principles of the invention may be adapted by one of skill in the art to migrate between any networks, including other UMTS networks, WiMAX (802.16) networks, other CDMA2000 networks and any other networks known in the art or later developed.

According to one embodiment, the mobile terminals 120 may include a wide range of portable electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1x evolution-data optimized (abbreviated as "EV-DO" or "1xEV-DO") and universal mobile telecommunications system ("UMTS"). The mobile terminals 120 also includes the hardware and software suitable to support the control plane functions needed to engage in wireless communication with eNB 112 and base stations 132. Such hardware can include a receiver, transmitter, central processing unit, storage in the form of volatile and nonvolatile memory, and input/output devices, among other hardware.

According to one embodiment, the EPC may include a mobility management entity ("MME") 116, which is a control plane entity that manages the attachment of mobile terminals 120 to the LTE network 110 and SAE Gateway 150, the authentication of mobile terminals 120, and may interface with a radio access network ("RAN") to create radio bearers. According to one embodiment, the MME 116 may be a signaling-only entity, such that IP data packets that originate from the mobile terminal 120 are not processed at the MME 116. The MME 116 may perform various functions, including non-access stratum ("NAS") signaling; NAS signaling security; tracking area list management for mobile terminals in idle and active mode; packet data network gateway ("PDN-GW") selection and serving gateway ("S-GW") selection; MME selection for handoffs that need MME changes; SGSN selection for handoffs to 2G or 3G 3GPP access networks; roaming; authentication; and bearer management functions; among other functions.

According to one embodiment, the EPC may include a Packet Data Network Gateway ("PDN-GW") 118, which is a user plane entity. The PDN-GW 118 provides an anchor point for the mobile terminal 120 and remains in communication with the mobile terminal 120 throughout a communication session, regardless of whether the mobile terminal 120 moves to different network nodes. The PDN-GW 118 may perform various functions, including packet filtering on a per-user basis; interception; mobile terminal IP address allocation; uplink ("UL") and downlink ("DL") service level charging, gating and rate enforcement; and transport level packet marking in the downlink; among performing other functions. Additionally, the PDN-GW 118 may manage mobility between legacy 3GPP networks and non-3GPP networks.

According to one embodiment, the EPC may include a Serving Gateway ("S-GW") 119, which is a user plane entity. The S-GW 119 may manage packet forwarding uplink and downlink between the PDN-GW 118 and a RAN environment. The S-GW 119 may perform various functions, including being a local mobility anchor point for inter-eNB handoffs; mobility anchoring for inter-3GPP mobility;

interception; packet routing and forwarding; transport level packet marking in the uplink and downlink; uplink and downlink per mobile terminal, PDN and quality of service class identifier ("QCI"); and accounting on user and QCI granularity for inter-operator charging; among performing other functions. According to one embodiment, the System Architecture Evolution ("SAE") Gateway 150 includes the PDN-GW 118 and the S-GW 119.

According to one embodiment of the invention, the LTE network 110 may include evolved Node-Bs 112a-112n (referred to collectively herein as "eNB 112") that include a server, transceivers for transmitting and receiving radio signals, and antennas. The eNB 112 may include two-way transceivers that broadcast data into the surrounding environment and typically act as mediators between wired and wireless networks. The eNB 112 may include tunneling modules 113a-113n (referred to collectively herein as "tunneling modules 113") that communicate with components of the LTE network 110 and the EV-DO network 130 to pass signaling data between the networks.

The eNB 112 typically performs several functions, including radio resource management, such as radio bearer control, radio admission control, connection mobility control, dynamic allocation of resources, e.g., scheduling, to mobile terminals 120 in both uplink and downlink; IP header compression and encryption of user data streams; selection of the MME 116 when the mobile terminal 120 is attached, if no MME routing is determined from information that is provided by the mobile terminal 120; routing of user plane data toward S-GW 119; scheduling and transmission of paging messages that originate from the MME 116; scheduling and transmission of broadcast information that originate from the MME 116; and measurement and measurement reporting configurations for mobility and scheduling, among performing other functions. Providing the control features in the eNB 112 reduces latency by introducing fewer hops in the media path and enabling spreading of the processing load across a plurality of eNBs 112. A network 114 may provide communications between the eNB 112 and the MME 116.

According to one embodiment, the LTE all-packet architecture improves quality of service ("QoS") by differentiating packet flows based on QoS requirements. The EPS enables establishment of QoS flows, or EPS bearers, between mobile terminals 120 and the Packet Data Network Gateway ("PDN-GW") 119. According to another embodiment, EPS bearers may be associated with QoS profiles and include a radio bearer and a mobility tunnel, which enable the LTE network 110 to prioritize data packets. According to another embodiment, when an IP packet is received at the PDN-GW 119, packet classification may be performed based on predefined parameters. According to still another embodiment, the PDN-GW 119 may send the IP packet through a selected mobility tunnel and the eNB 112 may map IP packets to appropriate radio QoS bearers.

In accordance with one embodiment, the EV-DO network 130 includes base stations 132a-132n (referred to collectively herein as "base stations 132"), a communications network 134, and a Radio Network Controller ("RNC") 136. The base stations 132 may include transceivers that transmit and receive radio signals, antennas, and equipment for encrypting and decrypting communications with the RNC 136. The base stations 136 may include hardware and software that implement the functions described herein to support control plane functions. The base stations may include a central processing unit ("CPU"), transmitter, receiver, and I/O devices and storage, such as volatile and nonvolatile memory, to implement the functions described herein. The base stations 132 communicate with the mobile terminal 120 over a radio interface 129. The communications network 134 supports communication between the base stations 132 and the RNC 136. According to one embodiment, the RNC 136 controls the base stations 132 and performs various control functions such as load control, admission control, packet scheduling, handover/handoff control, macrodiversity combining, security functions, and mobility management, among performing other control functions.

According to one embodiment of the invention, the LTE network 110 is the primary network for connecting the mobile terminals 120 to one or more remote parties 160. However, when the LTE network 110 is unavailable, unreliable and/or provides inferior QoS, or whenever the eNB 112 determines that an inter-technology handoff needs to be triggered, then the mobile terminals 120 may be moved to the secondary EV-DO network 130. According to one embodiment, the mobile terminals 120 may include a pre-registration module 122 that enables pre-registration with the EV-DO network 130 while the mobile terminals 120 are in an on-going communication session with the LTE network 110. The pre-registration module 122 may facilitate pre-registration with the secondary network to minimize a total procedure time required to move the mobile terminals 120 from the primary network to the secondary network, thereby reducing the risk of service loss. The mobile terminals 120 may perform a session configuration in the secondary network while actively maintaining communications in the primary network.

According to one embodiment, the mobile terminals 120 include single radio mobile terminals. The single radio mobile terminals 120 may be pre-registered with the EV-DO network 130 via the LTE air link, when the mobile terminals 120 enter an area supported by a LTE border cell. According to an alternative embodiment, the single radio mobile terminals 120 may be pre-registered with the EV-DO network 130 via the EV-DO air link when the mobile terminals 120 are switched on.

Pre-registration allows the mobile terminals 120 to establish a presence with the EV-DO network 130 in advance of a cell re-selection and/or handover/handoff procedure. The LTE network 110 may instruct the mobile terminals 120 over a broadcast channel and in a dedicated RRC message whether pre-registration is needed.

A measurement module 123 may perform radio measurements on the EV-DO network 130. The measurement module 123 may be located in the mobile terminals 120. The LTE network 110 may direct the measurement module 123 to perform the radio measurements on the EV-DO network cells. For single radio mobile terminals 120, measurement gaps may be needed to enable the mobile terminals 120 to switch to the EV-DO network 130 and perform the radio measurements.

According to one embodiment of the invention, the pre-registration signaling may include registration information, session information, and Point-to-Point Protocol ("PPP") information, among other pre-registration signaling. According to one embodiment of the invention, the pre-registration signaling may be sent transparently from the mobile terminal 120, through a corresponding eNB 112 and the MME 116, to the RNC 136 via a tunnel interface 139.

According to one embodiment of the invention, each eNB 112 of the LTE network 110 may be associated with an HRPD SectorID of the EV-DO network 130 to enable the MME 116 to select a correct radio network controller 136 for receiving the uplink tunneled messages. According to one embodiment of the invention, associating each eNB 112 with an HRPD SectorID also provides the target RNC 136 with technology-specific measurement information, including route update and pilot strength measurements.

According to one embodiment, mobile terminal 120 may provide context information to the RNC 136, including a user profile, user history, a network location, mobile terminal location, network capabilities, network services, charging models, user settings, application settings, hardware capabilities of the mobile terminal, current required services, and radio measurement, among other mobile terminal context information. Additionally, mobile terminal context information may include terminal status information, including a battery level or an interface status, among other terminal status information. Furthermore, the mobile terminal 120 may provide network information including network status information and network load information, among other network information.

According to one embodiment, code division multiple access ("CDMA") or cdma2000 technology generates cdma2000 messages that may be tunneled to the RNC 136 from the mobile terminal 120 over the LTE network 110. The tunneled cdma2000 messages are encapsulated in the uplink information transfer and downlink information transfer RRC messages. Messages that are sent through the tunnel interface 139 may include, but are not limited to, a session ID that identifies a target mobile terminal 120.

According to one embodiment of the invention, the handoff initiation modules 115a-115n (referred to collectively herein as "handoff initiation modules 115") may initiate a handoff from the LTE network 110 to the EV-DO network 130 upon confirmation that the mobile terminal 120 is in an active state and is pre-registered with the EV-DO network 130. If these conditions are satisfied, and if supported by measurement reports received from the measurement module 123 of the mobile terminals 120, then the handoff initiation modules 115 may initiate the handoff by sending an RRC message to the mobile terminals 120 requesting the handoff to occur. The RRC message may include the specified target type and any cdma2000 specific HRPD parameters that are needed by the mobile terminals 120 to create the HRPD messages needed to request a connection.

According to one embodiment of the invention, the mobile terminals 120 may continue to send and receive data on the LTE network 110 until receipt of a "handoff command". After receiving the "handoff command" at the mobile terminal 120, the mobile terminal 120 terminates communication with the LTE network 110 and starts acquiring the HRPD traffic channel. The HRPD handoff signaling is tunneled between the mobile terminals 120 and the EV-DO network 130 via the corresponding eNB 112 and the MME 116.

Figure 2:
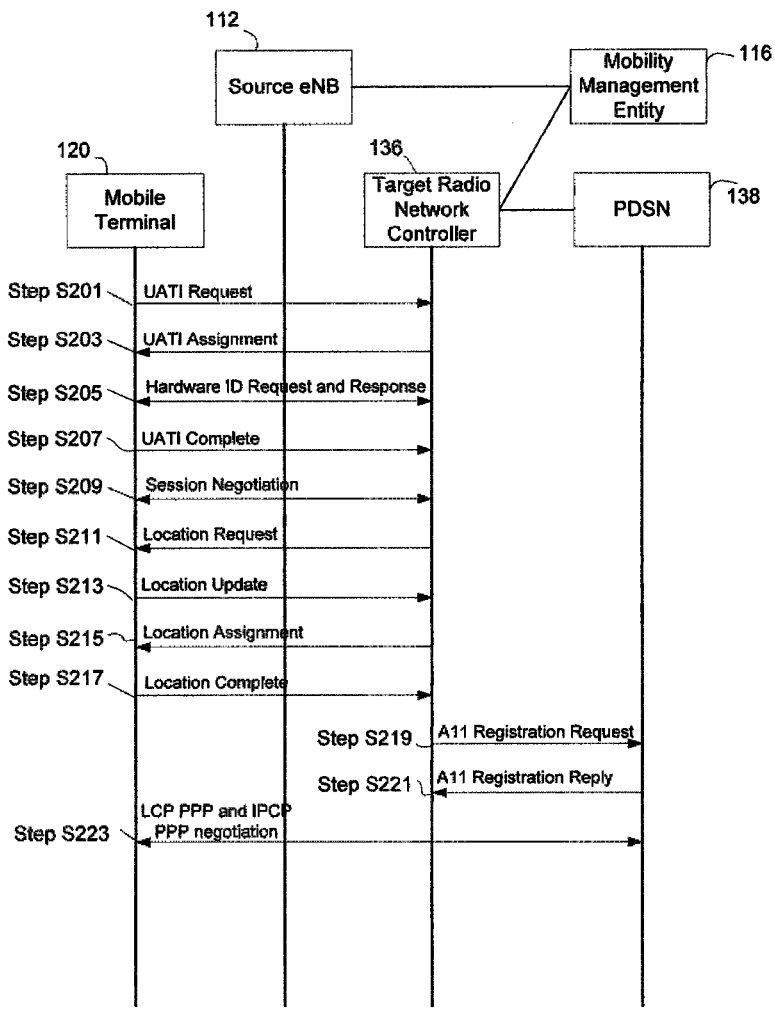
FIG. 2 is a flow diagram of a service flow for pre-registering a mobile terminal in a secondary access network, while the mobile terminal is actively communicating with the primary access network, in accordance with the principles of the present invention.

An exemplary pre-registration process of the mobile terminal 120 on the EV-DO network 130 is discussed with reference to FIG. 2. The mobile terminal 120, operating in an idle or active state, may initiate pre-registration based on information provided by the eNB 112. For example, the mobile terminals 120 may be entering into a region supported by a LTE border cell and may receive an indicator to initiate pre-registration. At step S201, the mobile terminal 120 may route a Unicast Access Terminal ID ("UATI") Request to the target RNC 136 in the EV-DO network 130 via the corresponding eNB 112 and the MME 116. According to one embodiment, the mobile terminal 120 may include a single radio that communicates with the target RNC 136 of the EV-DO network 130 by passing the EV-DO signal transparently through the eNB 112 and the MME 116. This operation may be performed by encapsulating the EV-DO signal in LTE radio signaling protocols, such as NAS signaling, for example. The encapsulated EV-DO signal may be tunneled, via tunneling interface 139, from the MME 116 to the RNC 136 without requiring the LTE network 110 to read and/or understand the EV-DO signaling. The tunneling interface 139 provides bi-directional communication between the LTE network 110 and the EV-DO network 130.

Signaling data packets that originate in the EV-DO network 130 and pass through the tunneling interface 139 may include a predetermined set of identification markers introduced by the RNC 136. The predetermined set of identification markers may trigger the MME 116 to intercept marked data packets. Data packets that do not include the predetermined set of identification markers may be routed from the EV-DO network 130 through the tunneling interface 139 to the mobile terminals 120. According to one embodiment, the data packets that do not include the predetermined set of identification markers are routed to the mobile terminals 120 without being processed at the MME 116 and/or the eNB 112. The MME 116 may monitor the data packets in real-time to detect the presence of the predetermined set of identification markers.

At step S203, the target RNC 136 provides the mobile terminal 120 with a Unicast Access Terminal ID ("UATI") assignment by passing the EV-DO signal transparently through the MME 116 and the eNB 112. At step S205, the target RNC 136 and the mobile terminal 120 exchange a Hardware ID request and a Hardware ID response. At step S207, the UATI is complete between the target RNC 136 and the mobile terminal 120. At steps S209-S217, the target RNC 136 and the mobile terminal 120 exchange commands. The commands may include session negotiation; location request; location update; location assignment; and/or location complete commands, among other commands. At steps S219 and S221, the RNC 136 and the PDSN 138 exchange an "A11" registration request and reply, which is a procedure to establish the "A10" link between the RNC 136 and the PDSN 138.

At step S223, the mobile terminal 120 and the PDSN 138 negotiate LCP PPP and IPCP PPP. According to one embodiment, continuity is maintained between the active connection at the LTE network 110 and the EV-DO network 130 by using the same IP address across both the LTE network 110 and the EV-DO network 130. Following the pre-registration, the PPP session may be placed on hold. While on hold, the mobile terminal 120 may maintain the HRPD context by performing periodic re-registration as needed.

Figure 3:
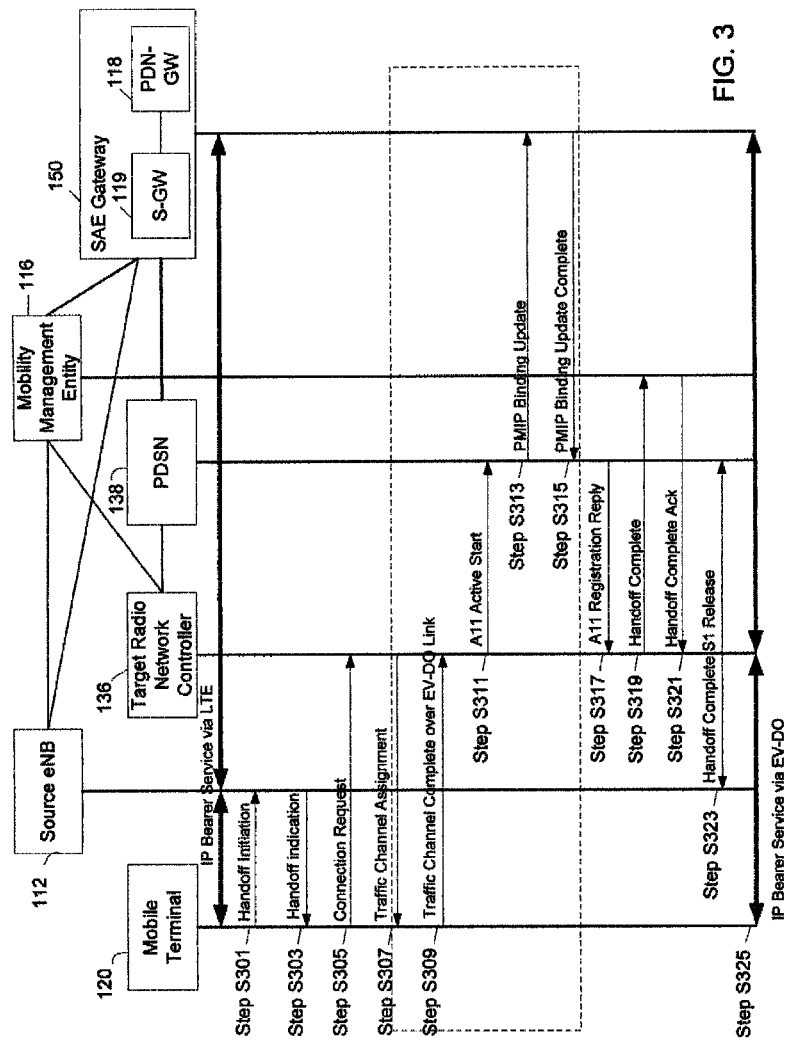
FIG. 3 is a flow diagram of a service flow for initiating and executing a handoff of communications between a primary access network and a secondary access network, in accordance with the principles of the present invention.

An exemplary hand off initiation process from the LTE network 110 to the EV-DO network 130 is discussed for the mobile terminal 120 with reference to FIG. 3. While the mobile terminal 120 is coupled to the LTE network 110 in an active state and pre-registered with the EV-DO network 130, the mobile terminal 120 receives IP bearer service via the LTE network 110. In Step S301, the eNB 112 may receive a report from the mobile terminal 120 identifying that the signal strength of the LTE network 110 has fallen below a predefined threshold. In Step S303, the eNB 112 may issue a handoff indication to the mobile terminal 120 instructing initiation of the handoff procedure. In Step S305, the mobile terminal 120 may encapsulate the connection request as an EV-DO signal in LTE signaling protocols, for example. The encapsulated EV-DO signal may be tunneled, via tunnel interface 139, from the MME 116 to the RNC 136, without requiring the LTE network 110 to read and/or understand the EV-DO signaling. The S-GW 119 IP address may be attached with the connection request. In Step S307, the target RNC 136 may encapsulate the traffic channel assignment as an EV-DO signal in LTE signaling protocols, for example. The encapsulated EV-DO signal may be tunneled, via tunnel interface 139, from the RNC 136 to the MME 116 without requiring the LTE network 110 to read and/or understand the EV-DO signaling. Advantageously, upon assignment of the traffic channel, a brief service interruption of approximately 100-150 ms may be introduced, as the radio communication switches from the LTE network 110 to the EV-DO network 130.

In Step S309, the mobile terminal 120 is coupled to the EV-DO network 130 to complete the traffic channel over the EV-DO air link. In Step S311, the target RNC 136 provides the PDSN 138 with an "A11" active start signal. In step S313, the PDSN 138 communicates a binding update of the proxy mobile IP ("PMIP") to the SAE Gateway 150 to trigger a traffic switch to the EV-DO network 130, while maintaining the IP address of the mobile terminal 120. In Step S315, the SAE Gateway 150 communicates with the PDSN 138 to complete the PMIP binding update.

In Step S317, the PDSN 138 provides the target RNC 136 with an "A11" registration reply. In Step S319, the handoff ("HO") complete message is tunneled over the tunnel interface 139 from the target RNC 136 to the MME 116 to trigger release of the LTE network 110 resources. In Step S321, the HO complete acknowledge message may be tunneled over the tunnel interface 139 from the MME 116 to the target RNC 136. In Step S323, the normal release messages are exchanged between the eNB 112 and the MME 116 to release LTE resources. In Step S325, while the mobile terminal 120 is coupled to the EV-DO network 130, the mobile terminal 120 receives IP bearer service via the EV-DO network 130.

The present invention advantageously provides a system, method and apparatus for facilitating seamless handoff of a mobile terminal having a single radio from an LTE network to an EV-DO network by employing a tunneling interface 139 and encapsulating EV-DO signaling over the LTE air link. By employing this improved handoff scheme, the mobile end user experiences a seamless transition from a primary network to a secondary network, without interruption of a service session.

The present invention may be realized in hardware, software, or a combination of hardware and software. An implementation of the method and system of the present invention may be realized in a centralized fashion in one computing system or in a distributed fashion, where different elements are spread across several interconnected computing systems. Any kind of computing system, or other apparatus adapted for carrying out the methods described herein, is suited to perform the functions described herein.

A typical combination of hardware and software may be a specialized or general-purpose computer system having one or more processing elements and a computer program stored on a storage medium that, when loaded and executed, controls the computer system such that it carries out the methods described herein. The present invention also may be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof. Accordingly, reference should be had to the following claims, rather than to the foregoing specification, as indicating the scope of the of the invention,

What is claimed is:

1. A system for enabling a mobile terminal to handoff communications between at least two different wireless access networks, the system comprising:
   a first wireless access network having a first air interface standard and a tunneling module;
   a second wireless access network having a second air interface standard that is different from the first air interface standard;
   the first wireless access network being configured to tunnel signaling data packets to the second wireless access network, the signaling data packets being tunneled to the second wireless access network using the first air interface standard;
   the first wireless access network receiving, from the mobile terminal, signaling data packets constructed in accordance with a second protocol associated with the second wireless access network that are encapsulated in a first protocol associated with the first wireless access network; and
   the tunneling module being in data communication with the second wireless access network to pre-register the mobile terminal with the second wireless access network without consuming air interface resources on the second wireless access network while the mobile terminal is engaged in a communication session in the first wireless access network, the pre-registration of the mobile terminal with the second wireless access network being triggered by detection of the mobile terminal within a first border cell of the first wireless access network, the first border cell of the first wireless access network being adjacent to a second border cell of the second wireless access network.

2. The system of claim 1, further comprising:
   a handoff initiation module, the handoff initiation module receiving a signal strength measurement from the mobile terminal to initiate a handoff of communications with the mobile terminal from the first wireless access network to the second wireless access network upon detecting that the mobile terminal is actively engaged in the communication session with the first wireless access network using the first air interface standard.

3. The system of claim 1, wherein the communication session between the mobile terminal and the first wireless access network is terminated by the first wireless access network after receiving a signal that the mobile terminal has completed the communications handoff with the second wireless access network.

4. The system of claim 1, wherein the first air interface standard includes Long Term Evolution 3GPP air interface standards and the second air interface standard includes CDMA2000 air interface standards.

5. The system of claim 1, further comprising:
   a mobility management entity associated with the first wireless access network; and
   a radio network controller associated with the second wireless access network, wherein the signaling data packets are tunneled between the mobility management entity and the radio network controller.

6. The system of claim 2, wherein the handoff initiation module initiates the handoff of communications with the mobile terminal from the first wireless access network to the second wireless access network upon receiving an alert from the tunneling module indicating that the mobile terminal is pre-registered with the second wireless access network.

7. The system of claim 1, wherein the pre-registration is performed using the second air interface standard on the second wireless access network during start-up of the mobile terminal.

8. The system of claim 1, wherein an internet protocol address assigned to the mobile terminal for use in the first wireless access network is a same internet protocol address used in the second wireless access network.

9. A method of facilitating handoff of communications with a mobile terminal between a first wireless access network having a first air interface standard and a second wireless access network having a second air interface standard different from the first air interface standard, the method comprising:

tunneling signaling data packets from the first wireless access network to the second wireless access network, the signaling data packets being tunneled to the second wireless access network using the first air interface standard;

the first wireless access network receiving, from the mobile terminal, signaling data packets constructed in accordance with a second protocol associated with the second wireless access network that are encapsulated in a first protocol associated with the first wireless access network; and pre-registering the mobile terminal with the second wireless access network without consuming air interface resources on the second wireless access network while the mobile terminal is engaged in a communication session in the first wireless access network, the pre-registration of the mobile terminal with the second wireless access network being triggered by detection of the mobile terminal within a first border cell of the first wireless access network, the first border cell of the first wireless access network being adjacent to a second border cell of the second wireless access network.

10. The method of claim 9, further comprising:

initiating a handoff of communications with the mobile terminal from the first wireless access network to the second wireless access network upon detecting that the mobile terminal is actively engaged in the communication session with the first wireless access network through the first air interface standard.

11. The method of claim 9, further comprising terminating the communication session between the mobile terminal and the first wireless access network after receiving a signal that the mobile terminal has completed the communications handoff with the second wireless access network.

12. The method of claim 9, further comprising assigning an internet protocol address to the mobile terminal for use in the second wireless access network that is a same internet protocol address used in the first wireless access network.

13. The method of claim 10, wherein initiating the handoff of communications with the mobile terminal from the first wireless access network to the second wireless access network occurs upon receiving an alert indicating that the mobile terminal is pre-registered with the second wireless access network.

14. The method of claim 9, wherein enabling pre-registration of the mobile terminal with the second access network includes periodically updating the pre-registration information.

15. A method of facilitating handoff of communications with a single radio mobile terminal between at least two different wireless access networks, the method comprising:

communicating with a first wireless access network having a first air interface standard;

communicating with a second wireless access network having a second air interface standard using encapsulated signaling data packets constructed in accordance with a second protocol associated with the second wireless access network, the signaling data packets being encapsulated in a first protocol associated with the first wireless access network; and using the encapsulated signaling data packets to pre-register the mobile terminal with the second wireless access network without consuming air interface resources on the second wireless access network while the mobile terminal is engaged in a communication session in the first wireless access network, the pre-registration of the mobile terminal with the second wireless access network being triggered by detection of the mobile terminal within a first border cell of the first wireless access network, the first border cell of the first wireless access network being adjacent to a second border cell of the second wireless access network.

16. The method of claim 15, wherein the first wireless access network is an LTE network and the second wireless access network is an EV-DO network.

17. The method of claim 16, wherein pre-registration includes:

establishing a point-to-point protocol session with the second wireless access network; and placing the point-to-point protocol session on hold.

* * * * *